April 10, 1956  E. O. N. TORGRIMSON  2,741,486
SLED RUNNER ATTACHMENT FOR WHEELED VEHICLES
Filed Nov. 5, 1954
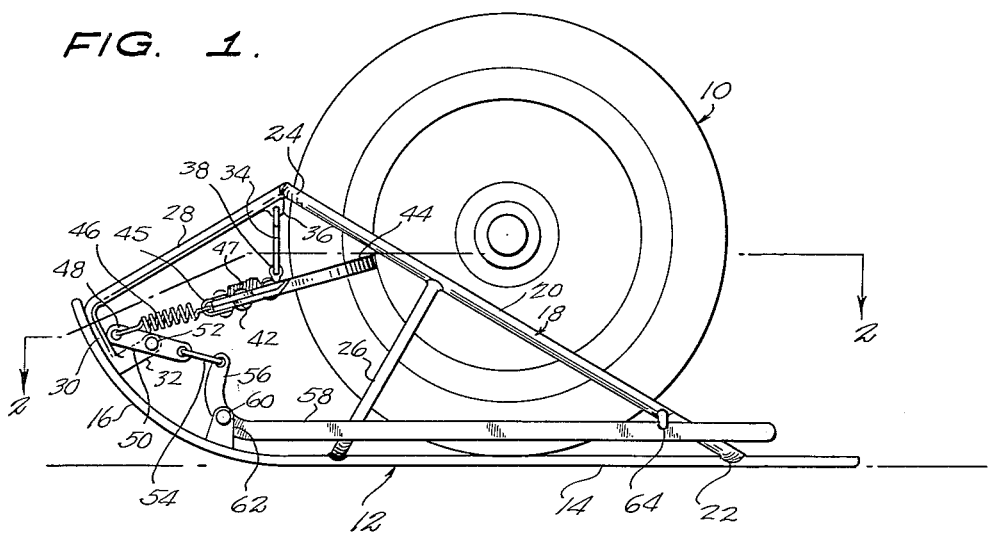
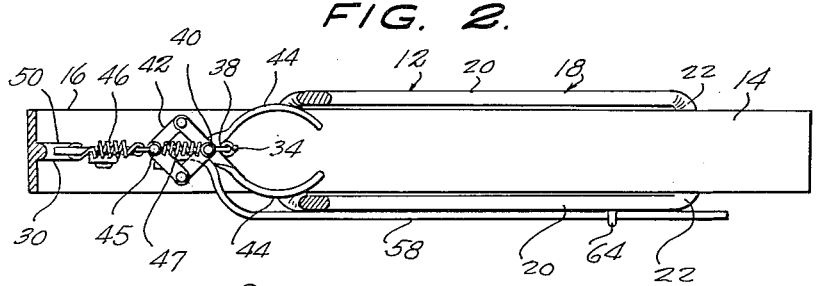
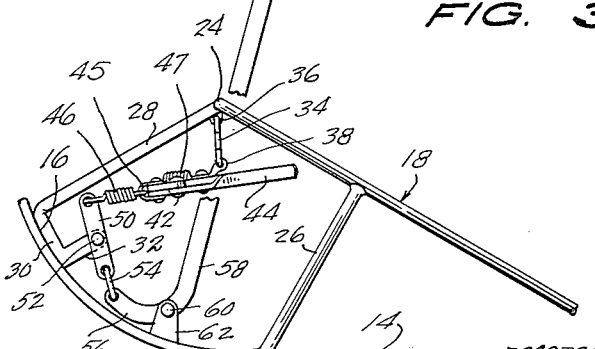
INVENTOR.
EUGENE O. N. TORGRIMSON,
BY
McMorrow, Berman & Davidson
ATTORNEYS.

United States Patent Office 2,741,486
Patented Apr. 10, 1956

2,741,486

SLED RUNNER ATTACHMENT FOR WHEELED VEHICLES

Eugene O. N. Torgrimson, Bieber, Calif.

Application November 5, 1954, Serial No. 466,966

2 Claims. (Cl. 280—13)

This invention relates to a clamp-on runner attachment for wheeled vehicles, especially those with pneumatic tires.

Heretofore, it has been proposed to provide sled runner attachments for wheeled vehicles. The main object of the present invention, in this connection, is to provide a generally improved attachment of the type stated, which can be clamped onto a wheel in a few seconds, and can be detached from the wheel with equal facility.

The desirability of a device of the type stated will be readily apparent in that it adapts, for travel over snow or ice, any wheeled vehicle having wheels which will ordinarily not roll in or over such a surface. In this way, children's play wagons can be converted to bodsleds having steerable runners at the front end. Similarly, a farm wagon can be converted into a sled, and further, a runner attachment can be placed on a wheel barrow, on the front wheels of an automobile, or on the wheels of an aircraft, all for the purpose of permitting the sliding over snow or ice of any wheel or wheels of many different types of vehicles, to facilitate the use of said wheels during snowy or icy periods.

A more specific object of the invention is to provide means on the runner adapted to be releasably engaged about the tire portion of a vehicle wheel when the wheel is supported upon the runner element of the device, which means can be shifted to wheel gripping or releasing positions merely by the throwing of a conveniently disposed handle.

Another object of importance is to provide a device of the type stated which will be capable of manufacture at low cost, and will be rugged and substantially trouble free in operation.

Other objects will appear from the following description, the claims appended thereto, and from the annexed drawing, in which like reference characters designate like parts throughout the several views, and wherein:

Figure 1 is a side elevational view of an attachment formed in accordance with the invention, as it appears when operatively engaged with a vehicle wheel;

Figure 2 is a sectional view on line 2—2 of Figure 1 in which the wheel has been removed; and Figure 3 is a fragmentary side elevational view showing the attachment in its released position.

The reference numeral 10 has been applied generally to a vehicle wheel. In this connection, it will be understood that the illustrated wheel can be a wheel of any type of vehicle, the runner attachment 12 constituting the invention being adapted for manufacture in various sizes to accommodate wheels of correspondingly different sizes.

The attachment 12 includes a flat, relatively wide runner 14 of heavy, rigid, strap metal or the like, said runner 14 being integral at its front end with an upwardly curving front end portion 16.

A frame designated generally at 18 is formed of heavy rod material, and includes straight, inclined side frame members 20 adapted to extend along opposite sides of the wheel to confine the wheel in a position in which said wheel will be supported wholly upon the runner 14. The side frame members 20 at their rear ends 22 are fixedly secured to the rear end portions of the runner 14 by means of braces 26.

At their upper, front ends, the members 20 are integrally connected by a curving bight 24 straddling the tire or rim portion of the wheel, and fixedly connected at its rear end to the middle of the bight is a front frame member 28 inclined oppositely to the members 20. At its lower, leading end, the member 28 is integral with a rearwardly and downwardly inclined extension 30 welded or otherwise fixedly secured to the upper end of the front end portion 16. The extension 30 at its rear end is integral with a short support leg 32 inclined in parallelism with and disposed in rearwardly spaced relation to the front frame member 28.

A depending wire link 34, having loops at its opposite ends, is pivoted loosely at its upper end to an apertured ear 36 fixedly secured to and extending downwardly from the member 28 adjacent the connection of said member 28 to the bight 24. At its lower end, the link 34 is similarly connected to an apertured, upwardly extending eye 38 pivotally connected to a pin 40 of a lazytongs 42. Pin 40 is disposed at the point of crossing of the tongs jaws 44, said jaws being oppositely and outwardly bowed so as to grip between them the tire portion of the wheel 10 in the closed position of the lazytongs.

At that end thereof remote from the jaws 44 the lazytongs is pivotally connected to a small yoke 45, to which is hooked one end of a spring 46. A spring 47 is connected between the yoke and pin 40, extending longitudinally and centrally of the lazytongs, so as to normally draw the lazytongs into a contracted condition tending to open the jaws 44.

The spring 46, at its other end, is pivotally connected at 48 to one end of a rocking link 50 fulcrumed intermediate its ends as at 52 upon the support leg 32. At its other end, the link 50 is pivotally connected to a connecting link 54, at one end of said connecting link. At its other end, the connecting link 54 is pivotally connected to the upwardly curving inner end 56 of an elongated lever handle 58 fulcrumed at 60 at the base of its inner end portion 56 upon an upstanding support bracket 62 welded or otherwise fixedly secured to the runner 14 at the base of the front end portion 16 thereof.

A downwardly turned hook or lug 64 is provided upon that side frame member 20 adjacent to the handle 58, said hook 64 engaging the free end portion of the handle when the handle is in the operative, jaw locking position thereof shown in Figure 1. In this position of the parts, the handle extends in closely spaced, parallel relation to the runner 14. It will be understood that the handle is disposed at the outer side of the runner attachment, where it can be conveniently grasped by a user. In the illustrated example, a left wheel attachment is illustrated, but it is understood that the right wheel runner attachment would have the handle disposed on the opposite side from that shown in the drawing.

In use of the device, the wheel is rolled onto the runner 14, to the position shown in Figure 1, with the handle in the released position shown in Figure 3. In this position of the handle, it extends upwardly, being inclined only slightly from the vertical. As a result, the springs 46, 47 are free to assert their normal tendency toward compression, thus causing the jaws 44 to be spread apart in open position.

With the wheel in the Figure 1 position, the handle 58 is rocked downwardly from its Figure 3 to its Figure 1 position, and is engaged under the hook 64. As a result, the lever 50 is rocked about its pivot 52 in a counterclockwise direction, viewing said lever as it appears in Figure 3. This places spring 46 under tension, causing the lazytongs to close, spring 47 being at the same time placed under tension. This causes jaws 44 to move toward one another into gripping engagement with opposite sides of the vehicle wheel. The device is now ready for use, permitting use of the vehicle as a sled.

To disengage the device from the wheel, it is merely necessary that the handle 58 be released from the hook 64. Springs 46, 47 will now be free to compress, pulling handle 58 to the Figure 3 position and causing the lazytongs to open as the spring 47 compresses.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A sled runner attachment for a vehicle wheel comprising a runner adapted to support said wheel; a frame fixed to and extending upwardly from said runner, said frame being proportioned to receive the wheel to hold the same against lateral movement off the runner; a lazytongs supported from said frame and including spreadable jaws at one end thereof disposed in position to grip said wheel when the jaws are closed; a spring on the lazytongs arranged to normally bias the jaws to a spread apart, wheel-releasing position; a handle pivotally mounted on the runner; and means connected between the handle and lazytongs adapted for closing the jaws against the force of said spring, responsive to rocking of the handle in one direction.

2. A sled runner attachment for a vehicle wheel comprising a runner adapted to support said wheel; a frame fixed to and extending upwardly from said runner, said frame being proportioned to receive the wheel to hold the same against lateral movement off the runner; a lazytongs supported from said frame and including spreadable jaws at one end thereof disposed in position to grip said wheel when the jaws are closed; a spring on the lazytongs arranged to normally bias the jaws to a spread apart, wheel-releasing position; a handle pivotally mounted on the runner; and means connected between the handle and lazytongs adapted for closing the jaws against the force of said spring, responsive to rocking of the handle in one direction, including a lever fulcrumed upon the frame and having a connection at one end to said handle, for rocking of the lever in one direction responsive to rocking of the handle in said one direction thereof, and a resilient, yielding connection between said lever and lazytongs, adapted to be placed under tension to actuate the lazytongs to a jaw-closing position responsive to rocking of the lever in said one direction thereof.

References Cited in the file of this patent

UNITED STATES PATENTS

| | | |
|---|---|---|
| 957,164 | Johnson et al. | May 3, 1910 |
| 983,324 | Thim | Feb. 7, 1911 |
| 1,321,247 | Schou | Nov. 11, 1919 |
| 2,282,608 | Rempel | May 12, 1942 |
| 2,514,470 | Call | July 11, 1950 |

FOREIGN PATENTS

| | | |
|---|---|---|
| 495,644 | Canada | Sept. 1, 1953 |